(12) United States Patent
Conrad et al.

(10) Patent No.: US 7,971,418 B2
(45) Date of Patent: Jul. 5, 2011

(54) HEADER WITH EXTENDIBLE CUTTER BAR

(75) Inventors: William P. Conrad, Bettendorf, IA (US); Jeffrey A. Nelson, Moline, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/748,822

(22) Filed: Mar. 29, 2010

(65) Prior Publication Data

US 2011/0005184 A1 Jan. 13, 2011

Related U.S. Application Data (60) Provisional application No. 61/224,459, filed on Jul. 9, 2009, now abandoned.

(51) Int. Cl.
*A01D 43/00* (2006.01)
(52) U.S. Cl. .................. 56/181; 56/219; 56/162
(58) Field of Classification Search .......... 56/181, 56/14.4, 219, 10.2 R, 10.2 E, 130, 364, 162
See application file for complete search history.

(56) References Cited

U.S. PATENT DOCUMENTS

| 2,235,602 | A | * | 3/1941 | Biesemeyer | 56/181 |
| 2,720,743 | A | * | 10/1955 | Prather | 56/207 |
| 2,795,922 | A | * | 6/1957 | Hume | 56/257 |
| 4,800,711 | A | * | 1/1989 | Hurlburt et al. | 56/219 |
| 5,261,216 | A | * | 11/1993 | Schumacher et al. | 56/14.4 |
| 5,711,140 | A | * | 1/1998 | Burmann | 56/208 |
| 5,752,372 | A | * | 5/1998 | Buermann | 56/10.2 E |
| 6,351,931 | B1 | * | 3/2002 | Shearer | 56/181 |
| 7,412,816 | B2 | * | 8/2008 | Coers et al. | 56/208 |
| 7,472,533 | B2 | * | 1/2009 | Talbot et al. | 56/181 |
| 7,549,280 | B2 | * | 6/2009 | Lovett et al. | 56/208 |
| 7,600,364 | B2 | * | 10/2009 | Lovett et al. | 56/181 |
| 7,730,707 | B2 | * | 6/2010 | Pietricola et al. | 56/221 |
| 2009/0007534 | A1 | * | 1/2009 | Sauerwein et al. | 56/14.5 |
| 2009/0107094 | A1 | * | 4/2009 | Bich et al. | 56/10.2 E |

* cited by examiner

*Primary Examiner* — Árpád Fábián-Kovács (57) ABSTRACT

A header for an agricultural harvester has left side and right side endless belt conveyors and a central conveyor for carrying crop to a central aperture in the header and an extendible and retractable cutter bar assembly disposed immediately in front of the leading edges of the conveyors that can be extended and retracted in the direction of travel through an agricultural field.

16 Claims, 11 Drawing Sheets

HEADER WITH EXTENDIBLE CUTTER BAR

RELATED APPLICATIONS

This application claims priority from U.S. provisional patent application No. 61/224,459, filed on Jul. 9, 2009 now abandoned which is incorporated herein in its entirety for all that it teaches.

FIELD OF THE INVENTION

The invention relates to headers for combines. More particularly, it relates to headers having cutter bars that extend laterally across the width of the leading edge of the header.

BACKGROUND OF THE INVENTION

Headers are devices that are mounted to and across the front of agricultural combines to cut crop plants and direct them toward a crop-receiving opening of the combine for threshing, separating and cleaning inside the combine.

Some headers use a reciprocating cutter bar or knife that is disposed across the leading edge of the header adjacent to the ground. The cutter bar severs the plant stalks close to the ground. A reel is also provided on these headers to control the tops of the plants. The reel pushes the top of the plant rearward, causing the plant to fall into a conveyor. The conveyor directs the plant laterally toward a central portion of the header where there is a crop-receiving aperture. Once the crop passes through this aperture it is received in a crop-receiving aperture of the combine, which further conveys the plant back rearward into the combine for further processing.

There are two common styles of headers. The first of these is called an "auger platform" or "auger header" because it has a long right circular cylindrical steel auger or screw that extends laterally across the width of the header. The auger is mounted for rotation at the rear of the header. This style of header provides a broad, generally flat metal floor or apron along the leading edge of the header that extends fore and aft between the cutter bar and the auger and extends laterally the entire width of the header.

The second of these is called a "draper platform" or "draper header". A draper header has no stationary apron or floor behind the cutter bar, nor does it have an auger located at the rear of the header. The floor is instead replaced with two generally flat endless loop conveyor belts to move the crop laterally to the middle of the header. The conveyor belts are located immediately behind the cutter bar and extending rearward to the back wall of the header, taking the place of the floor and the auger of the auger header. A central conveyor is located between these two conveyors to receive the cut crop material and covey it rearward into the crop-receiving aperture.

One problem for these headers is gathering the entire crop plant being harvested. Headers are constructed to harvest a wide array of plants, from small shrub-like soybeans plants that are less than 800 mm tall to thick shrub-like European canola plants that can approach 3 m in height. It is difficult to design a header that is capable of harvesting the full range of plant heights. A small header is economical to operate, but may not be able to harvest the largest of crop plants.

For this reason, auger-type headers have been configured to have an extendible cutter bar that can move forward and backward in the direction of travel. When the cutter bar is extended (i.e. when it is moved forward in the direction of travel with respect to the rest of the auger header), it is particularly suited to harvest harvesting tall bushy canola plants. When it is retracted it is particularly suited to harvest short, shrub-like plants or grasses.

To prevent crop material from falling into a gap between the cutter bar and the leading edge of the auger header, a metal sheet is attached to the cutter bar that extends rearward from the back edge of the cutter bar and covers substantially the entire width of the apron when the cutter bar is retracted. When the cutter bar moves to its extended position, however, the metal sheet moves forward with the cutter bar and uncovers the apron while still covering the gap between the apron and the cutter bar. In short, the metal sheet has a constant width, and moves front to back with the cutter bar itself, thereby covering and uncovering the sheet metal apron in front of the auger.

EP 0 726 025 A1 illustrates an example of this design, showing an auger header with an extendible cutter bar having a flat panel fixed to it that slides backward and forward on top of the flat metal floor of the header when the cutter bar extends and retracts. By automatically overlapping the floor of the header with the panel extending from the cutter bar, the cutter bar can be extended and retracted with little extra work.

The Claas Vario header has an extendible cutter bar using a different arrangement. In the Claas Vario header, the cutter bar is extended to create a gap between the cutter bar and the floor of the header. Once this gap is created by extending the cutter bar, the operator then manually inserts an elongate gap-filling metal panel (or panels) that fills the gap. When the cutter bar is retracted, the operator first unbolts the metal panel and removed it to create a gap, and the cutter bar is then retracted. This process requires several additional steps to complete.

Draper headers, however, cannot employ retractable cutter bars due to the location and orientation of their conveyor belts. In a draper header the conveyor belts are located immediately behind the cutter bar in order to permit the draper header to harvest small crops. There is no extended sheet floor of the header that extends between the cutter bar and the conveyor as there is in an auger header, and therefore there is no apron to be covered and uncovered as the cutter bar extends and retracts as there is in an auger header.

Any metal sheet that would cover the gap between the cutter bar and the front edge of the conveyor belt when the cutter bar is extended (such as the metal sheet in the auger header arrangement) would be pulled so far rearward when the cutter bar is retracted that it would partially or completely cover the conveyor belt of the draper header.

On the other hand, if no metal sheet is provided to cover the space between an extended cutter bar and the leading edge of the conveyor belts, then crop will fall into the gap between the cutter bar and the conveyor belts and so drop onto the ground.

For this reason, it has not been possible to provide a draper header with a retractable cutter bar.

The invention disclosed herein solves the technical problem of providing a draper header with an extendible cutter bar, the solution of which is provided by claim 1 by a first configuration and claim 11 by a second configuration. Other beneficial features are claimed in the claims depending therefrom.

SUMMARY OF THE INVENTIONS

In accordance with one aspect of the invention, a header is provided comprising an elongate frame configured to be suspended from a feederhouse of a combine and to extend laterally in a direction perpendicular to a direction of travel of the combine, the frame defining a central aperture configured to pass cut crop material to the combine; left side and right side endless belt conveyors mounted on the frame and disposed to carry cut crop material laterally inward toward a central portion of the frame, each of the left side and right side endless belt conveyors having an endless belt with a side edge disposed along a leading edge of the header; a central endless belt conveyor mounted on the frame between the left side and right side endless belt conveyors and disposed to carry cut crop material rearward to the central aperture, the central conveyor having a roller about which an endless belt rotates, the roller extending generally laterally and adjacent to the leading edge of the header; and a cutter bar that extends laterally generally parallel and immediately adjacent to the side edges and the roller when in a first position, and extends laterally and spaced forward away from the side edges and the roller when in a second position.

A crop support sheet may have a crop support surface that extends from the cutter bar to the side edges and the roller in both the first and second positions. The crop support sheet may have a crop support surface that is flexible. The crop support sheet may have a rear edge that is fixed adjacent to the side edges and the roller to prevent translation when the cutter bar is translated between the first and second positions. The header may have a plurality of laterally spaced apart beams that are fixed to a laterally extending rear frame member and extend forwardly therefrom, each of the beams having an elongate flange. The cutter bar may be a part of a cutter bar assembly having rearwardly extending members that are supported on the elongate flanges.

In accordance with another aspect of the invention, a header for an agricultural combine is provided, comprising a frame including left and right ends; a left side conveyor disposed on the left side of the frame and having a first endless belt disposed to receive crop severed on the left side of the header and carry it to a central conveyor; a right side conveyor disposed on the right side of the frame and having a second endless belt disposed to receive crop severed on the right side of the header and carry it to the central conveyor; a central conveyor disposed between the left and right side conveyors and having an endless belt disposed to receive crop severed from a central region of the head, and to receive crop deposited by the left side and right side conveyors, and to convey said severed crop rearward to a central aperture in the frame; a cutter bar assembly supported for slideable movement on the frame toward and away from the direction of header travel during field harvesting, the cutter bar assembly further comprising a cutter bar and a reciprocating knife supported thereon, said reciprocating knife and cutter bar extending across the front of the header in front of the left and right side conveyors and the central conveyor; at least one actuator coupled to the cutter bar assembly and to the frame of the header to extend and retract the cutter bar with respect to the frame.

In accordance with another invention, a crop sheet is provided to fill the gap between an extended cutter bar and the frame of the header. This crop sheet is retractable into the leading edge of the header or the cutter bar such that it does not cover a larger amount of the top surface of the header floor or the cutter bar when it is retracted than it does when it 9 and the cutter bar) is extended. The crop support sheet may have an adjustable length in the direction of travel such that it extends from the cutter bar to the top run of the left and right conveyor in a plurality of extension positions, with a constant spacing between the cutter bar and the crop support sheet in the plurality of extension positions and a constant spacing between the left and right conveyors in the plurality of extension positions. The crop support sheet may include a plurality of individual sections spaced apart across the width of the header in the direction of travel. Each section of the crop support sheet may be received in an elongate slot disposed in the cutter bar assembly at the cutter bar to slide therethrough as the cutter bar assembly is extended or retracted. The crop support sheet may comprise a fabric. The fabric may be impregnated with a flexible polymeric material. The cutter bar assembly may include at least two tubular members extending generally in the direction of travel, said two tubular members being slidably supported on a corresponding at least two additional tubular members fixed to the frame. The two tubular members and the two additional tubular members may be rectangular and may be telescopically interengaged. The frame may include a plurality of forwardly extending beams, each of said plurality of forwardly extending beams having a lower flange, and further wherein the cutter bar assembly has a corresponding plurality of tubular members, each of said corresponding plurality of tubular members having a slot therein to receive the lower flange of a corresponding forwardly extending beam.

In accordance with another invention, an extendible crop support sheet is provided for a header having an elongated frame with left side and right side conveyors configured to carry cut crop material toward a central opening in the frame, the frames being either of the auger type or the endless belt type, the conveyor further having a cutter bar that extends across the entire width of the frame and is slidably supported on the frame to extend forward from and be retracted rearward toward the frame, the cutter bar and the frame defining therebetween an aperture extending the width of the header when the further comprise a crop support sheet extending laterally across the substantially the entire width of the header in a direction perpendicular to the direction of travel, and extending between the cutter bar and the leading edge of the left and right conveyors in the direction of travel. The crop support sheet may have an adjustable length in the direction of travel such that it extends from the cutter bar to the top run of the left and right conveyor in a plurality of extension positions, with a constant spacing between the cutter bar and the crop support sheet in the plurality of extension positions and a constant spacing between the left and right conveyors in the plurality of extension positions. The crop support sheet may include a plurality of individual sections spaced apart across the width of the header in the direction of travel. Each section of the crop support sheet may be received in an elongate slot disposed in the cutter bar assembly at the cutter bar to slide therethrough as the cutter bar assembly is extended or retracted. The crop support sheet may comprise a fabric. The fabric may be impregnated with a flexible polymeric material. The cutter bar assembly may include at least two tubular members extending generally in the direction of travel, said two tubular members being slidably supported on a corresponding at least two additional tubular members fixed to the frame. The two tubular members and the two additional tubular members may be rectangular and may be telescopically interengaged. The frame may include a plurality of forwardly extending beams, each of said plurality of forwardly extending beams having a lower flange, and further wherein the cutter bar assembly has a corresponding plurality of tubular members, each of said corresponding plurality of tubular members having a slot therein to receive the lower flange of a corresponding forwardly extending beam

DETAILED DESCRIPTION OF THE PREFERRED EMBODIMENTS

Figure 1:
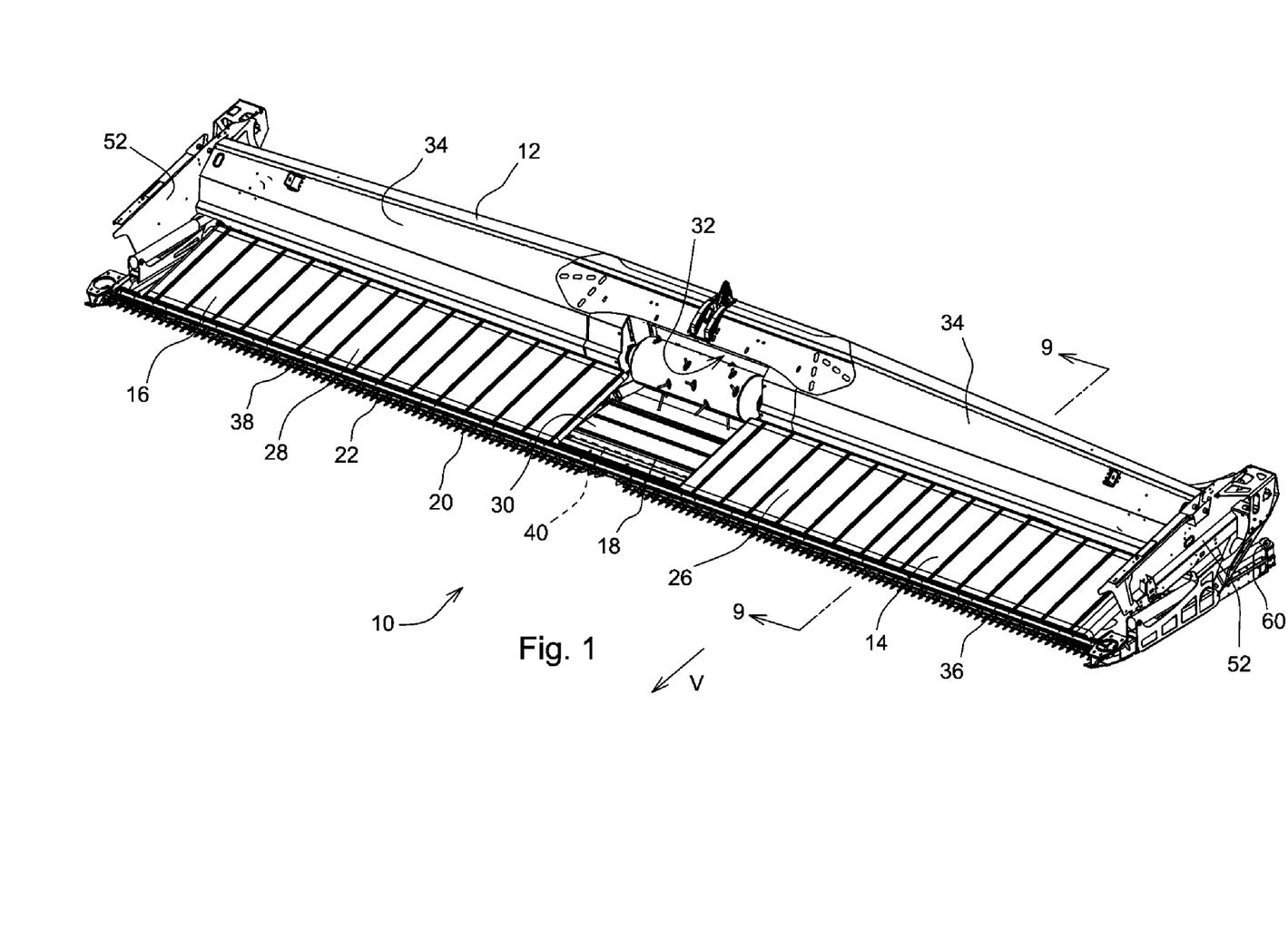
FIG. 1 is a perspective view of a header in accordance with the above inventions in which the cutter bar is retracted.

In the discussion herein, terms such as "front", "forward" and the like refer to the direction of travel of the header (and the combine upon which it is mounted) in a straight line through the field when it is harvesting crops. This direction is horizontal and perpendicular to the longitudinal extent of the header. It is indicated in FIG. 1 as direction of travel "V". The terms "rear", "rearward", "behind" and the like refer to a direction opposite direction of travel "V". The terms "lateral", "laterally", "side-to-side" and the like refer to a direction that is horizontal and perpendicular to direction of travel "V" and also parallel to the longitudinal extent of the header.

Figure 2:
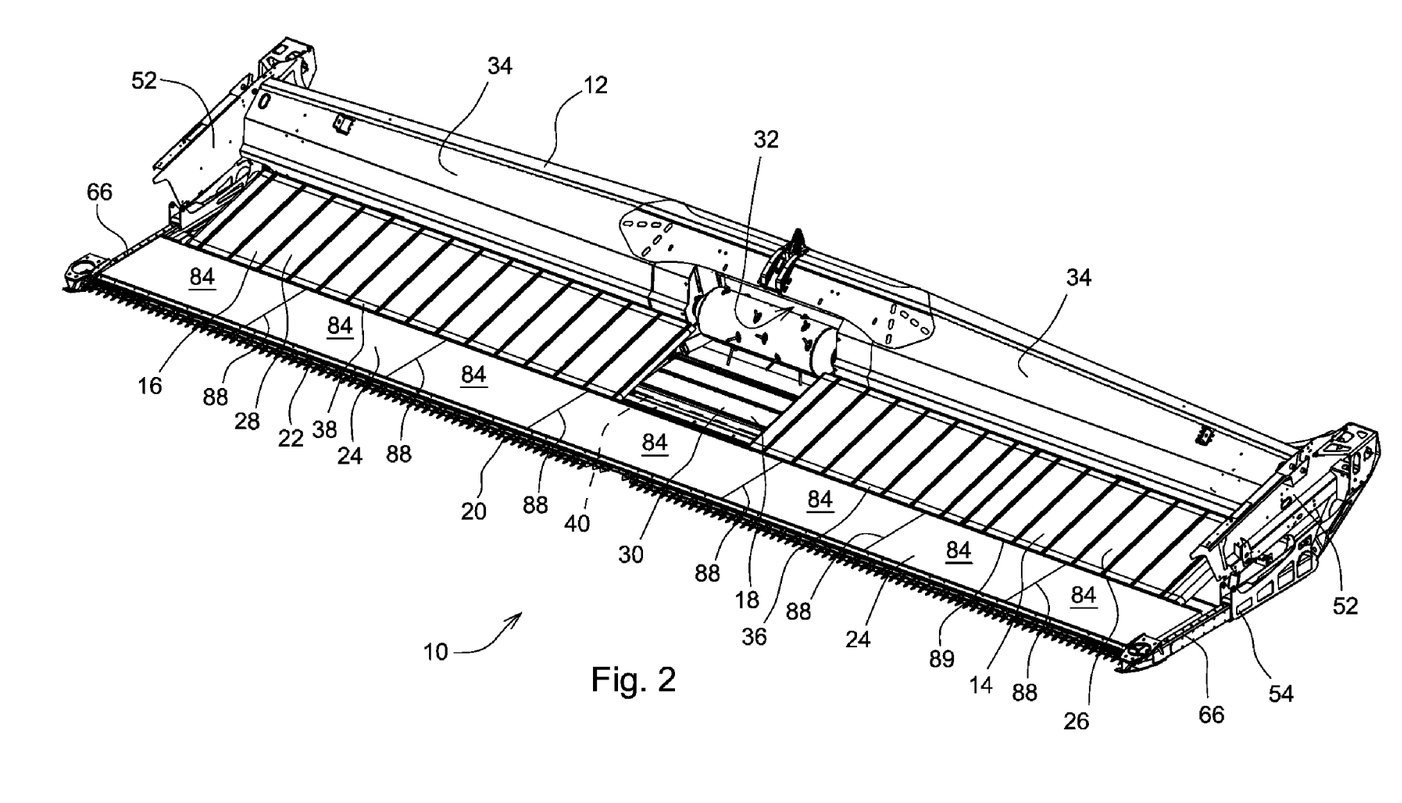
FIG. 2 is a perspective view of the header of FIG. 1 in which the cutter bar is extended.

FIGS. 1 and 2 illustrate a header 10 comprising a frame 12, a left side conveyor 14, a right side conveyor 16, a center conveyor 18, a cutter bar assembly 20 including a cutter bar 22, and a crop support sheet 24 extending between the cutter bar 22 and the leading edge of the header 10.

The left and right side conveyors 14, 16 have endless belts 26, 28, respectively, that are disposed such that the upper surfaces of the belts are driven inwardly toward the middle of the header and to convey cut crop material onto the center conveyor.

The center conveyor has an endless belt 30 that is disposed to be driven rearwardly toward a central aperture 32 in the rear wall 34 of the header 10. Cut crop material received in the center conveyor is conveyed through the central aperture 32 and into the feederhouse of the combine (not shown).

The endless belts 26, 28 have side edges 36, 38, respectively, that are disposed immediately adjacent to and parallel to the cutter bar spaced a distance of less than 5 cm from the cutter bar when the cutter bar is in the retracted position shown in FIG. 1.

The center conveyor 18 is supported on and rotates about a roller 40 that extends laterally and generally parallel to the side edges 36, 38. It extends parallel to and is disposed immediately adjacent to cutter bar 22 when the cutter bar is in the retracted position shown in FIG. 1.

Unlike the arrangement of an auger conveyor with extendable cutter bar, there is no metal sheet that extends rearwards from cutter bar 22 to support the cut crop material as it falls backward from the cutter bar 22 after it is severed from the ground.

FIG. 2 shows the cutter bar 22 in its extended position. Immediately behind the cutter bar 22 is crop support sheet 24 which extends from the cutter bar 22 to the side edges 36, 38 and roller 40. In this extended position it covers the gap between the cutter bar and the conveyors to prevent cut crop material from falling into the gap and being drawn under the header.

Figure 3:
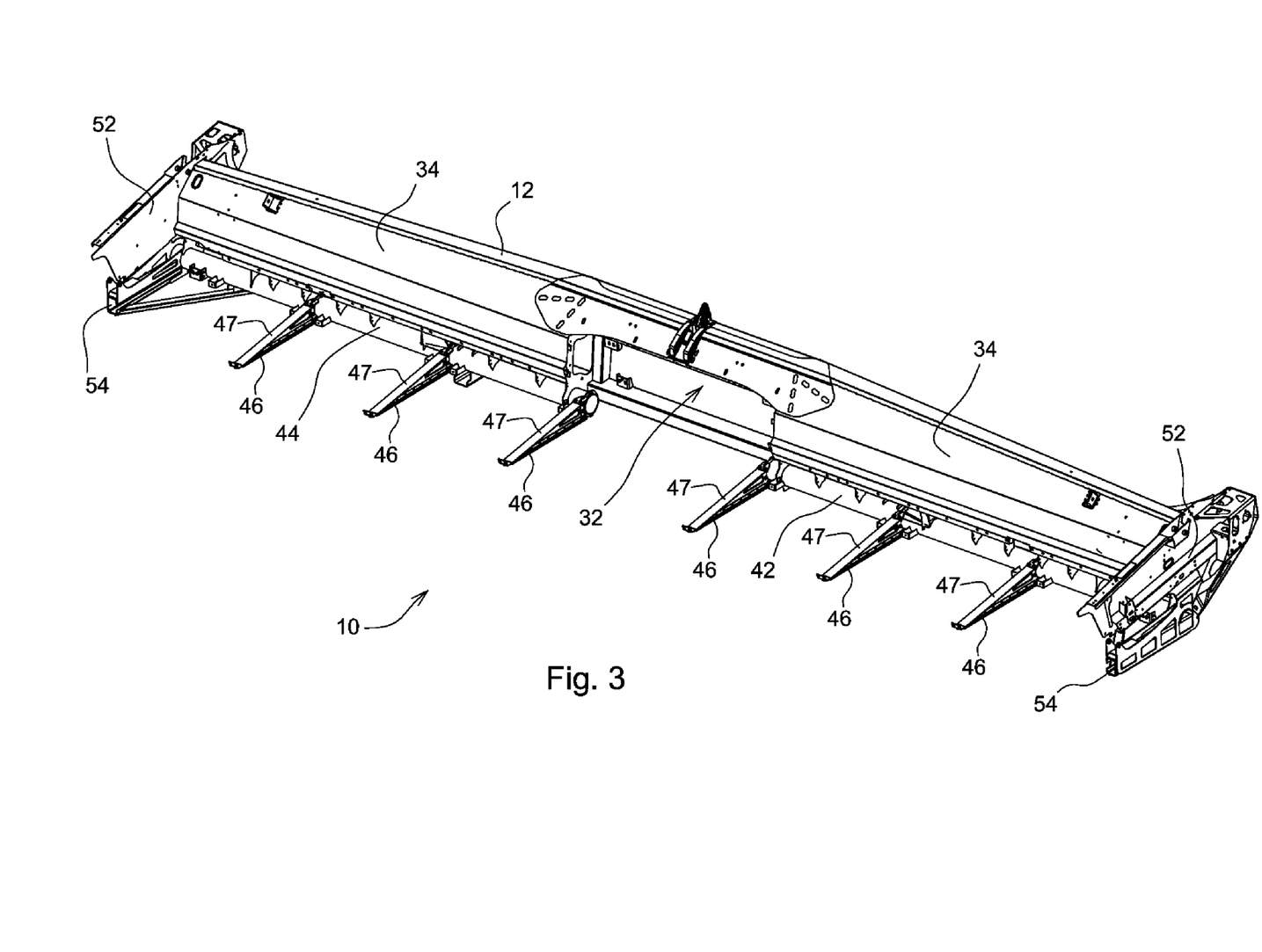
FIG. 3 is a perspective view of the header of the foregoing FIGURES showing the header frame with the left and right side conveyor belts removed.
Figure 4:
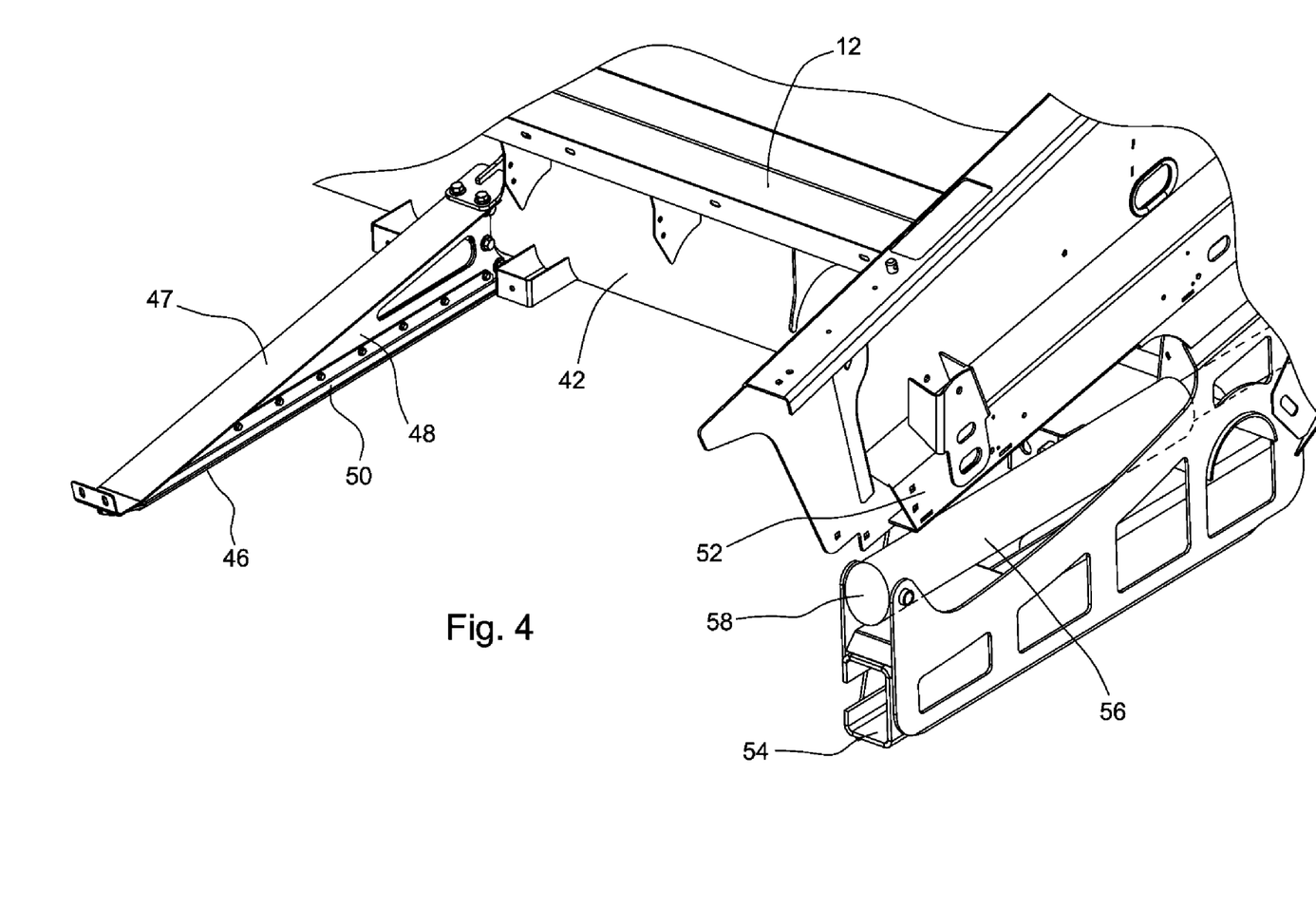
FIG. 4 is a close-up of the header frame of FIG. 3.

Referring now to FIGS. 3 and 4, the header frame is shown with the cutter bar assembly and belts removed. The rear portion of the frame includes two elongate members 42, 44 that extend laterally on either side of the central aperture. Several laterally spaced-apart beams 46 are fixed at their rear ends to the two elongate members 42, 44 and extend forwardly therefrom. The beams include a generally horizontally disposed upper flange 47 from which a web 48 extends downwardly. At the bottom of each web 48 a lower flange 50 is fixed that extends generally horizontally from both sides of the web 48 and extends in a front-to-rear direction substantially the entire length of beam 46.

The frame includes end frames 52 that define the lateral ends of the frame 12. The end frames 52 include rectangular support members shown here as tubes 54 that are fixed in the end frames 52. Tubes 54 receive and slidably support corresponding end support beams that are fixed to and extend rearward from the lateral ends of the cutter bar (FIGS. 5, 6).

Figure 5:
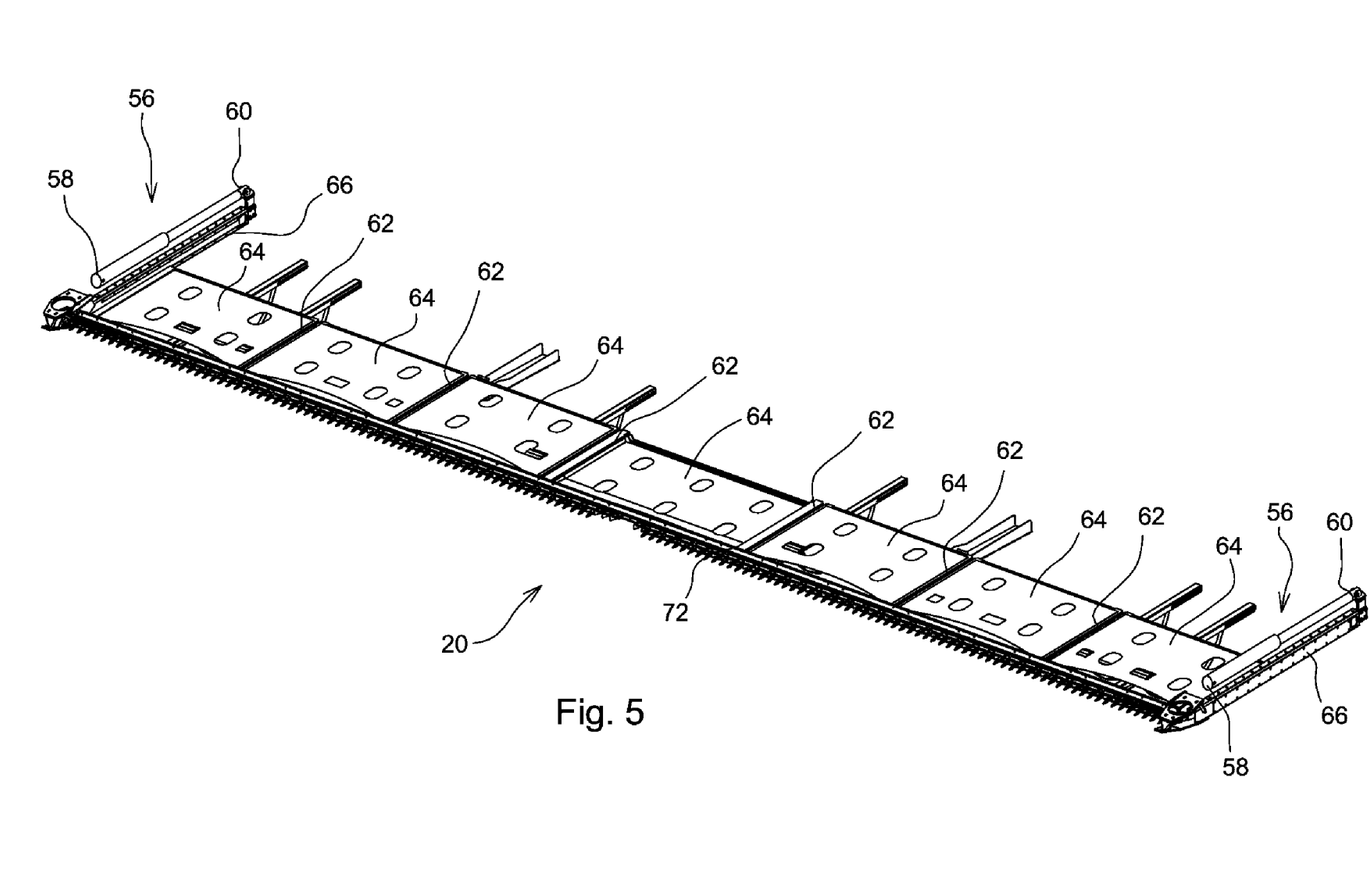
FIG. 5 is a perspective view of the cutter bar assembly of FIGS. 1 and 2.
Figure 6:
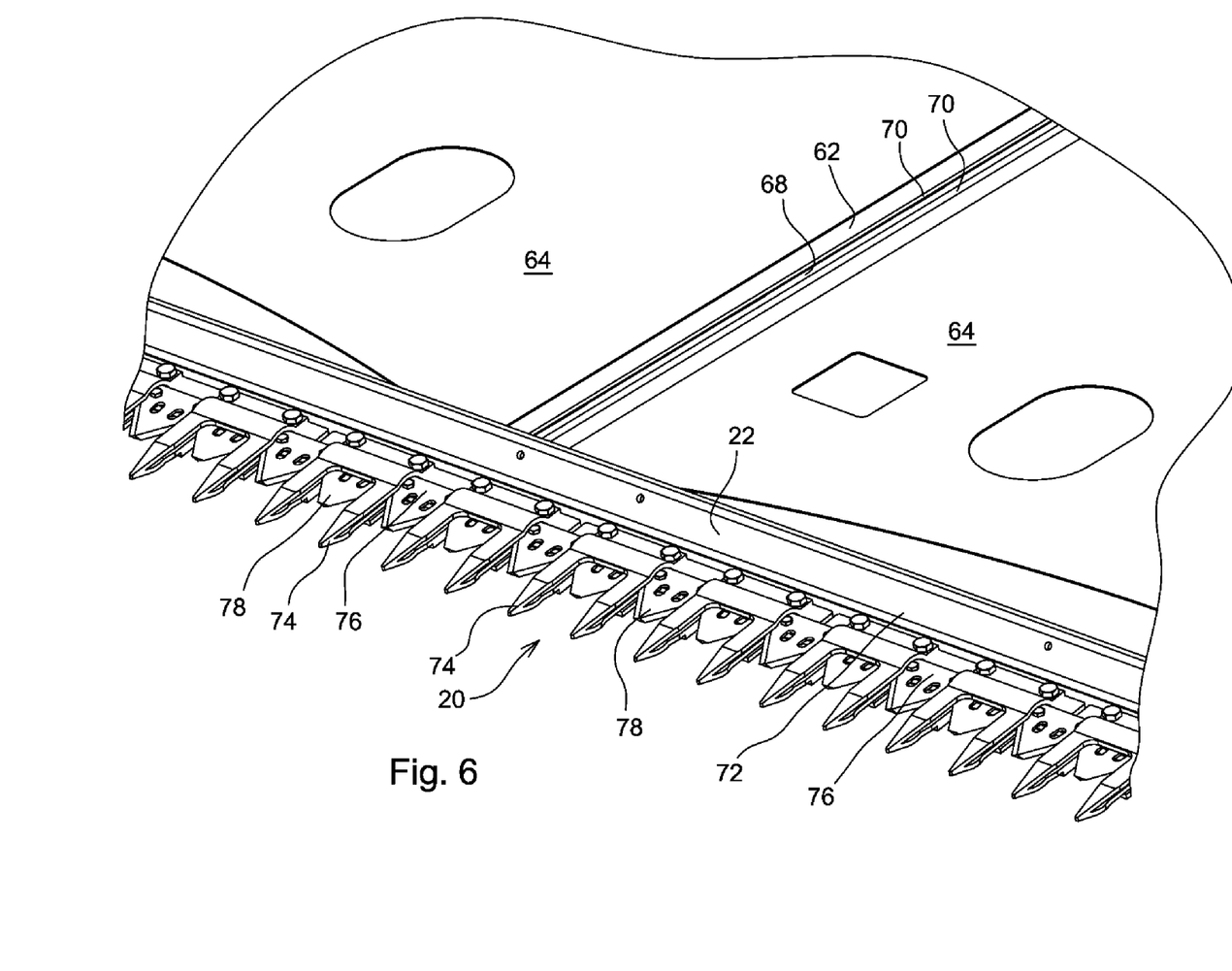
FIG. 6 is a close-up view of the cutter bar assembly of FIG. 5.

Hydraulic cylinders 56 are disposed within the end frames with a first end 58 coupled to each end frame and a second end 60 coupled to the corresponding members (in particular the end support beams 66) on the ends of the cutter bar assembly (see e.g. FIGS. 5-6).

In FIGS. 5 and 6, the cutter bar assembly is shown. The cutter bar assembly includes the cutter bar, a plurality of support beams 62 that are fixed to and extend rearward from the cutter bar, a plurality of sheets 64 that are fixed to adjacent support beams 62, and two generally rectangular end support beams 66 that are received in tubes 54 of frame 12.

Elongate slots 68 are formed in the upper surface of support beams 62 to slidably receive the lower flanges 50 of beams 46 and thereby be supported on beams 46. The slots are lined with anti-friction strips 70 that extend inside slot 68 and are disposed between support beams 62 and web 48 and flanges 50.

Support beams 62 are fixed to beam 72 of cutter bar 22 that extends laterally across the entire width of cutterbar 22. Knife support beam 72 is elongate and extends the entire width of header 10. Knife support beam 72 supports a plurality of forwardly extending knife guards 74. Knife guards 74 in turn support a reciprocating knife bar 76 for reciprocating movement and on which a plurality of generally triangular knife blades 78 are fixed in a near abutting or abutting relation as shown herein. As the knife bar is reciprocated within the knife guards, the blades shear the crop plants against the knife guards.

Figure 7:
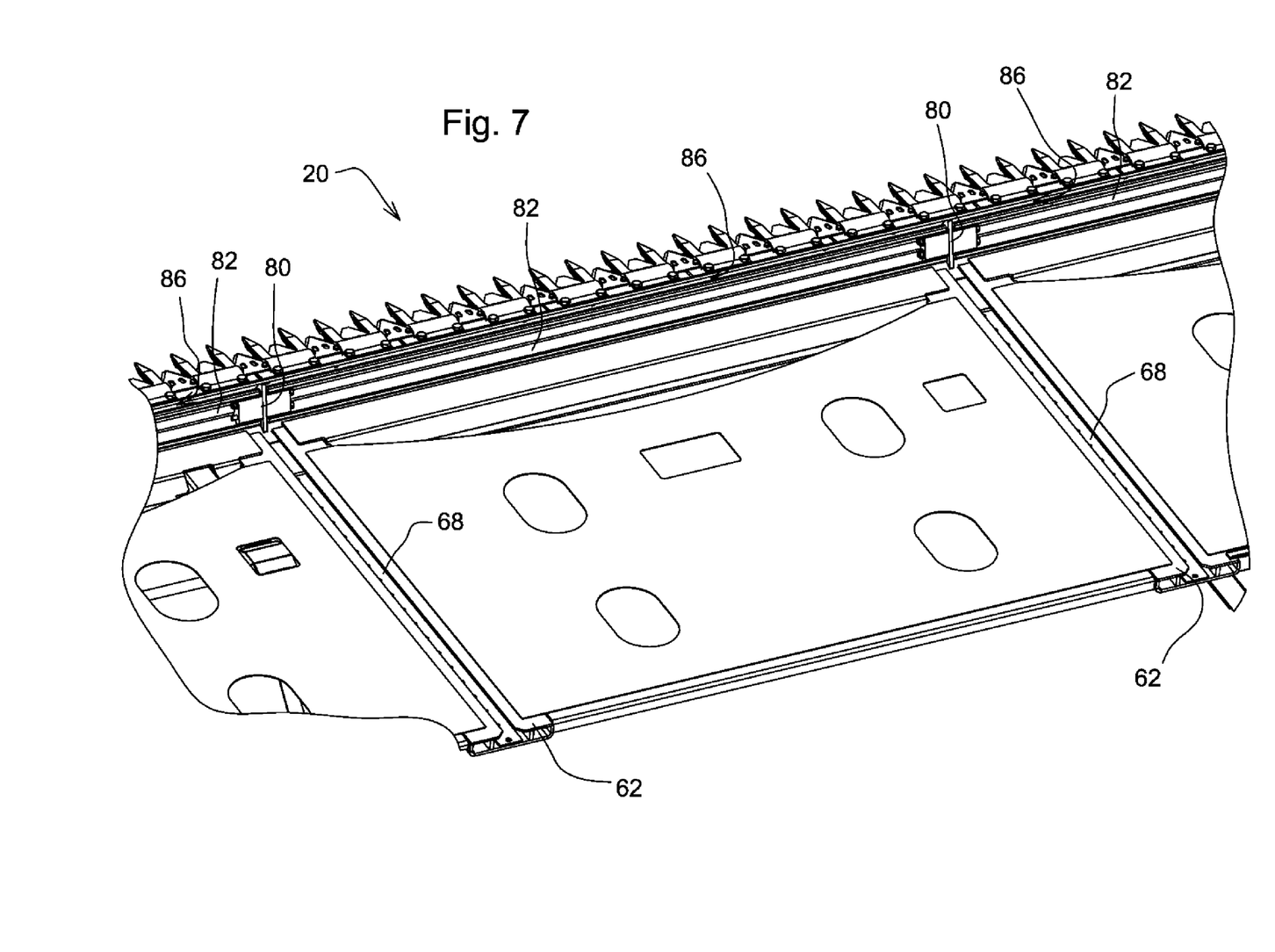
FIG. 7 is a reverse perspective view of the cutter bar assembly of FIGS. 5-6.
Figure 8:
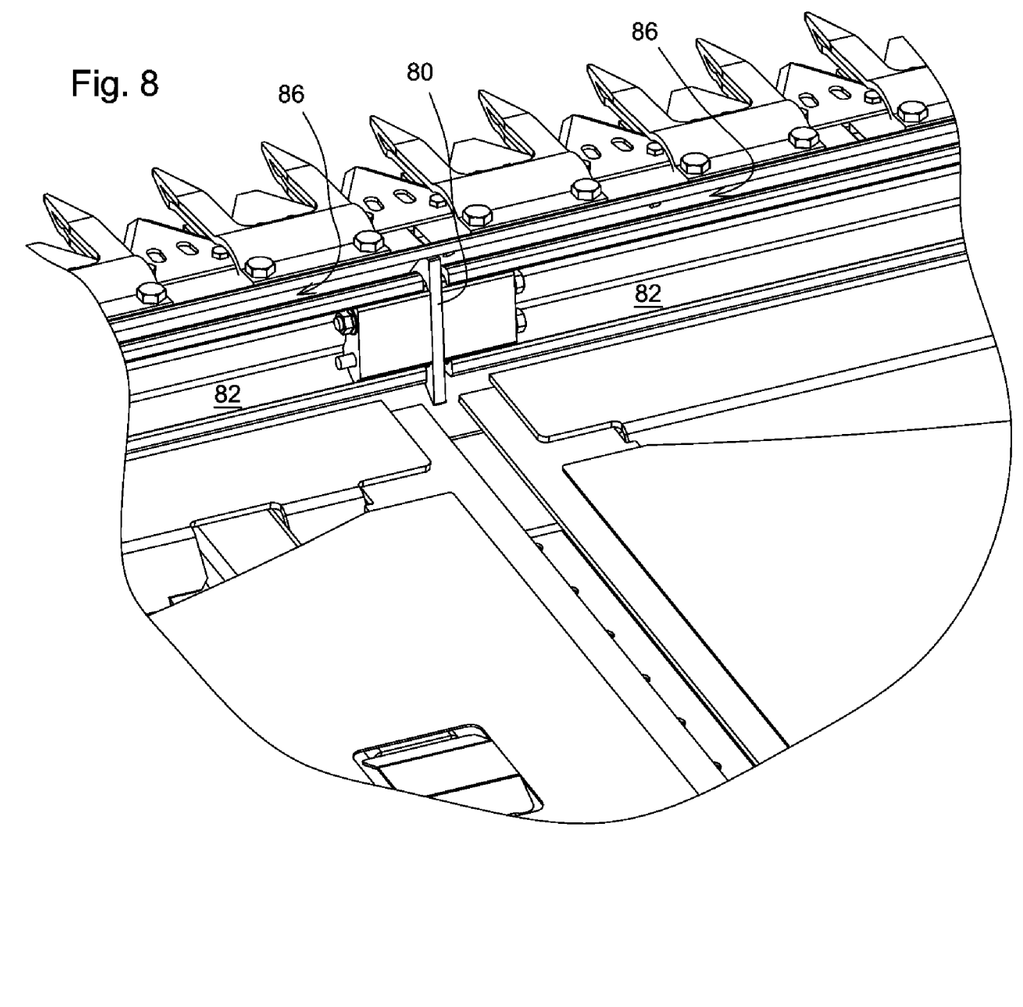
FIG. 8 is a close up view of the cutter bar assembly of FIG. 7.

FIGS. 7 and 8 illustrate a rear perspective view of the cutter bar assembly of FIGS. 5 and 6. The view of FIGS. 7 and 8 illustrate the arrangement of the back side of the cutter bar. Mounts 80 are fixed (preferably welded) to the inside rear surface of the cutter bar (particularly, the inside surface of knife support beam 72). Guide bars 82 are fixed between each pair of adjacent mounts 80 to support a section 84 (see FIG. 2) of the crop support sheet.

Guide bars 82 are fixed at their ends to adjacent mounts 80, leaving an elongated slot 86 between the cutter bar and the guide bar that extends from mount 80 to adjacent mount 80. The mounts are narrow (approximately 10 mm in width measured in a direction parallel to the longitudinal extent of the cutter bar.

Referring to FIG. 8, the mounts 80 are quite thin as measured in a horizontal direction perpendicular to the direction of travel, thus permitting adjacent sections 84 of the crop support sheet 24 to be closely spaced to each other having a fore-and-aft extending gap 88 of approximately 10 mm (see FIG. 2) between adjacent sections 84. This gap is sufficiently narrow that only a few crop grains will fall through gaps 88 when the header is operated.

Referring to FIGS. 2 and 8, there are seven sections 84 of crop support sheet 24 that are disposed adjacent to each other across substantially the entire width of header 10. Each of these sections 84 has a laterally extending first edge 89 that extends substantially the entire width of its corresponding section 84 a width sufficient to secure the first edge adjacent to the leading edge of the conveyor belt in front of which it is disposed and to which it directs cut crop material. Each of the first edges 89 is fixed to a laterally-extending elongate member 90.

Figure 9:
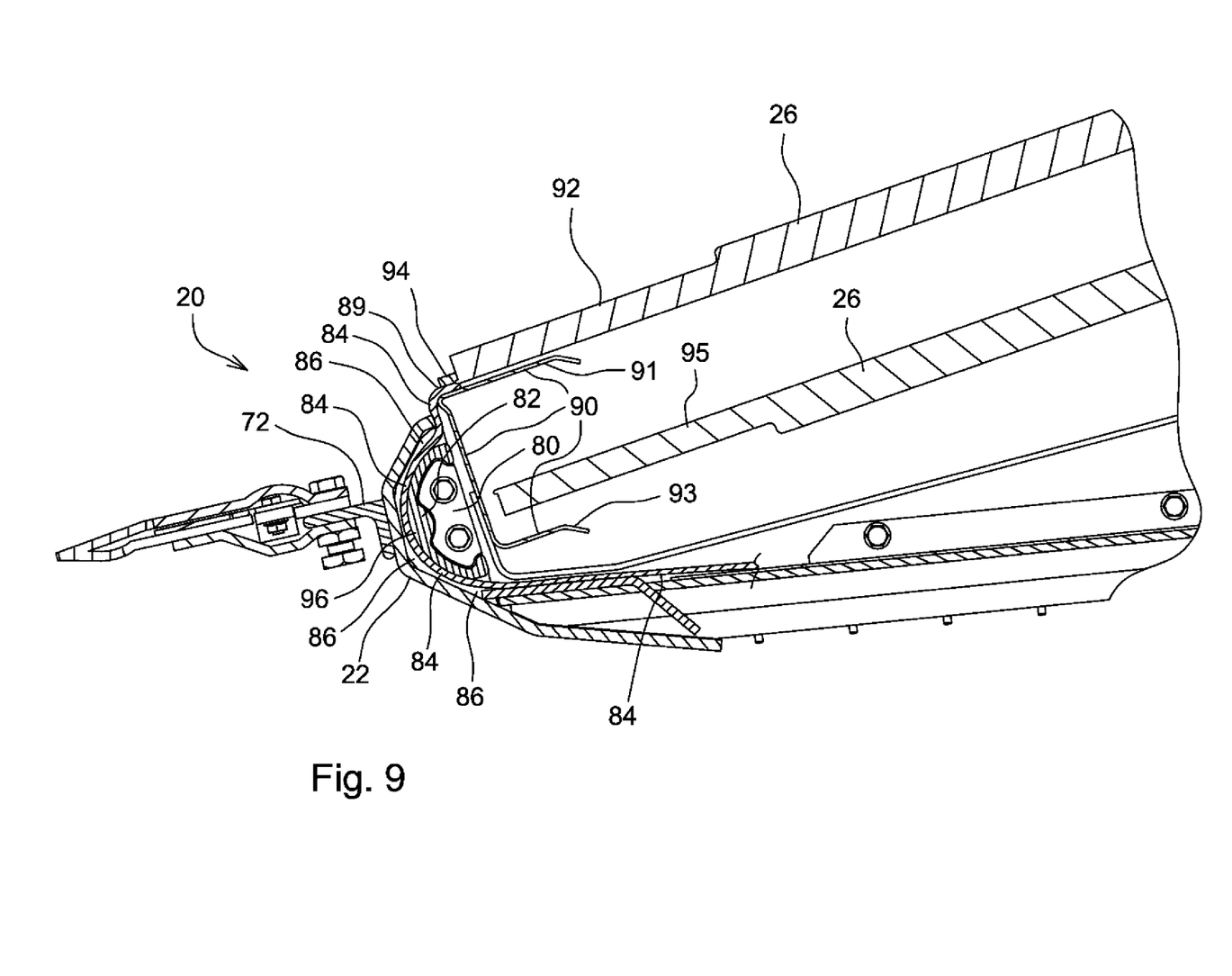
FIG. 9 is a cross sectional view of the header taken at section line 9-9 in FIG. 1. this illustrates the construction of the left side conveyor.
Figure 10:
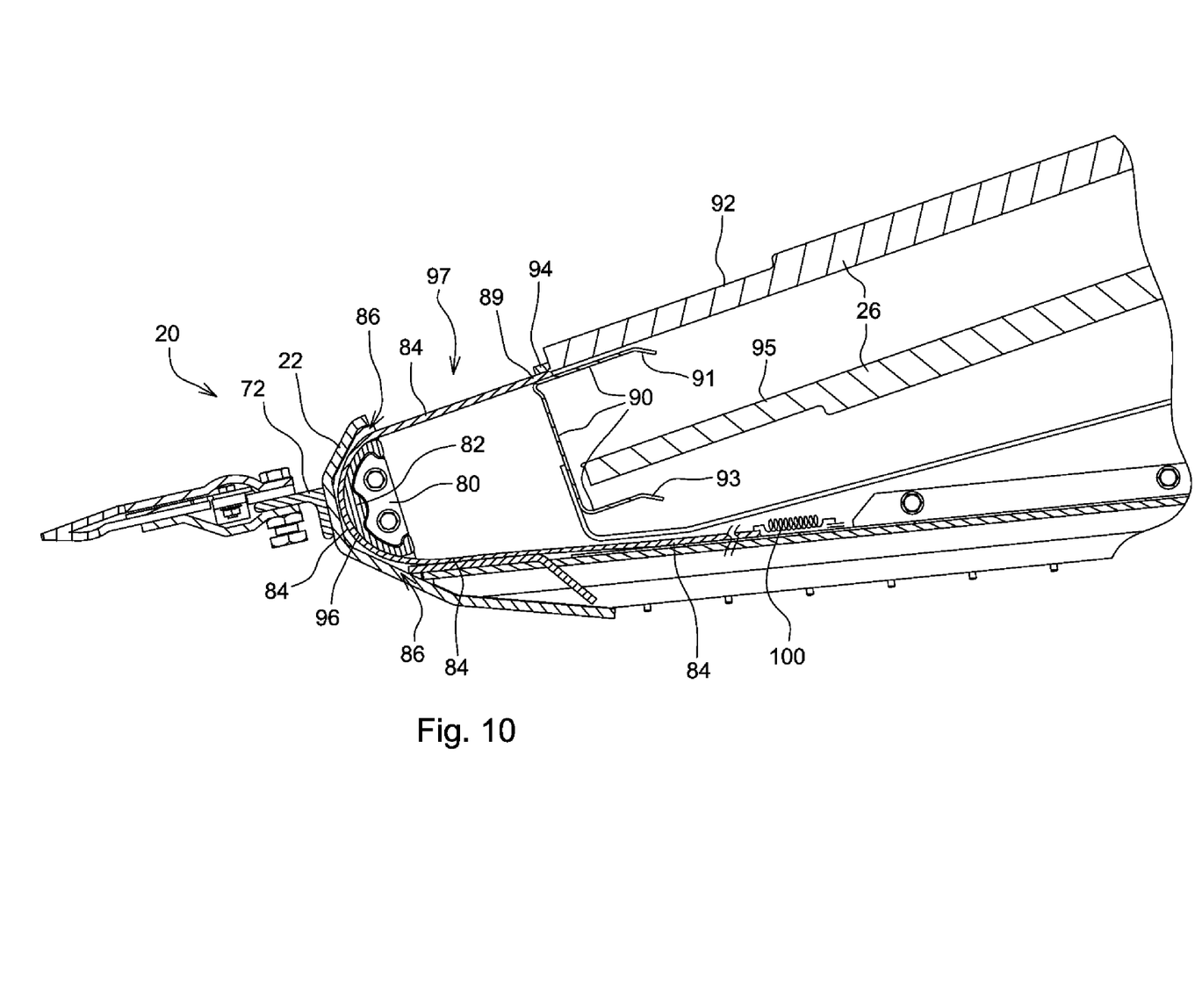
FIG. 10 shows the same cross sectional view as that of FIG. 9, but with the cutter bar assembly slightly extended to show how the crop support sheet is extended.

Referring to FIGS. 9 and 10, elongate member 90 is fixed to the forward ends of beams 46 on the left side of the header and extends laterally across the width of the header underneath the side edges 36 of the endless belt 26 of the left side conveyor 14.

The right side conveyor 16 is identically constructed but in mirror relation, and thus the construction of FIGS. 9 and 10 is the same on the right side.

As shown best in FIG. 2, the center conveyor also has a section 84 of the crop support sheet 24 that extends laterally in front of an innermost portion of the left and right side conveyor and in front of the center conveyor 18. This center section 84 of the crop support sheet 24 is constructed identically to the arrangement shown in FIGS. 9 and 10, but is disposed with respect to center conveyor roller 40 and belt 30 as sections 84 on either side are disposed with respect to the forward edges of belts 26, 28.

Elongate member 90 has an upper flange 91 that extends laterally across the width of each conveyor 14, 16 along the leading edge of the endless belt 26 and supports the upper run 92 of the conveyor belt 26.

Elongate member 90 also has a lower flange 93 that extends laterally across the width of the conveyor and supports the lower run 95 of endless belt 26. This keeps endless belt 26 from bowing downward under the weight of the crop when it is deposited on the belt.

As similar arrangement is provided in front of the center conveyor in which a similar elongate member extends across the width of roller 40 of the center conveyor to insure that crop material severed by the cutter bar 22 in front of the center conveyor and falling on the crop support sheet in front of the center conveyor is carried onto the top surface of the conveyor belt of the center conveyor.

By locating the surface of crop support sheet 24 immediately adjacent to the elongate member 90 (and therefore immediately adjacent to the crop-carrying top surface of endless belt 26, each section 84 of crop support sheet 24 is held at the same height as the top surface of endless belt 26; crop falling on crop support sheet 24 will thereby travel smoothly up the crop support sheet 24 and be transferred to the conveyor 14.

First edges 89 are fixed to elongate laterally extending member 90 by an elongate laterally extending bar 94 (FIG. 8) that is fixed to the upper surface of first edges 89, to thereby compress first edges 89 against elongate member 90. Threaded fasteners (not shown) extend through bar 94 and first edges 89 and into elongate member 90 to removably fix bar 94 to elongate member 90 with first edges 88 disposed therebetween. In an alternative arrangement, several bars 94 are fixed to elongate member 90, each bar being just long enough to clamping a single section 84 to elongate member 90, and each bar 94 being as long as the width of a single section 94. In this manner, individual sections 84 can be removed and replaced without having to loosen adjacent sections 84 as well.

Section 84 of crop support sheet 24 extends from bar 94 forward and downward through elongate slot 68. Section 84 is flexible so it can curve around the inside surface 96 of guide bar 82 and extend out of the bottom of elongate slot 68. Section 84 extends rearward into the space beneath endless belt 26 and above sheets 64. The rear or second edge of section 84 is coupled to a spring to keep section 84 under a constant spring tension. Section 84 is preferably made if a flexible polymeric coated fabric to give it the wear resistance and flexibility needed to pass through the slot 86 and reverse direction without breaking or tearing.

In FIG. 9, section 84 is shown in its initial position, corresponding to that of FIG. 1, in which the cutter bar assembly is completely retracted into the frame 12. FIG. 10, in contrast to FIG. 9, shows the position of the cutter bar assembly when it is partially extended forward by hydraulic cylinders 56 providing a gap between the cutter bar and the leading edge of the left and right conveyors.

In the FIG. 10 configuration, the cutter bar assembly is shown in its extended position and the individual sections 84 of the crop support sheet 24 are also shown in their corresponding extended positions in which they provide aprons 97 that extend between the leading edges of the three conveyors (and the leading edges of the header and header frame) and the cutter bar.

This apron is pulled out from under the header itself, pulled upwards through the elongate slot in the cutter bar assembly and pulled into the gap between the now-extended cutter bar and the leading edges of the three conveyors.

In this manner, the crop support sheet covers up the gape between the cutter bar and the conveyors and provides a smooth transition for cut crop material to flow up and onto the conveyors without losing crop material, preventing it from falling on the ground between the cutter bar and the leading edge of the header.

FIGS. 11A-11F show several different embodiments of an extendible cutter bar with crop support sheet.

Figure 11A:
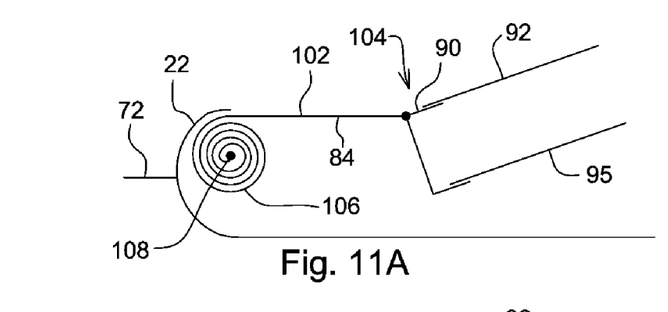
FIGS. 11A-11F are illustrations of alternative crop support sheet arrangements.
Figure 11B:
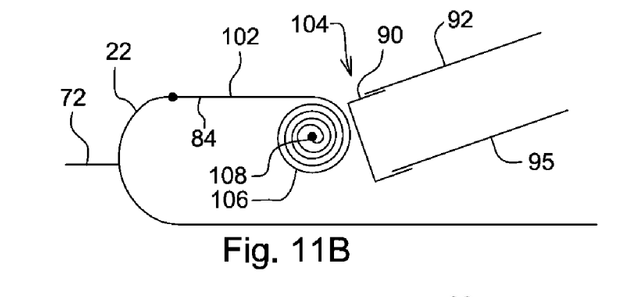
Figure 11C:
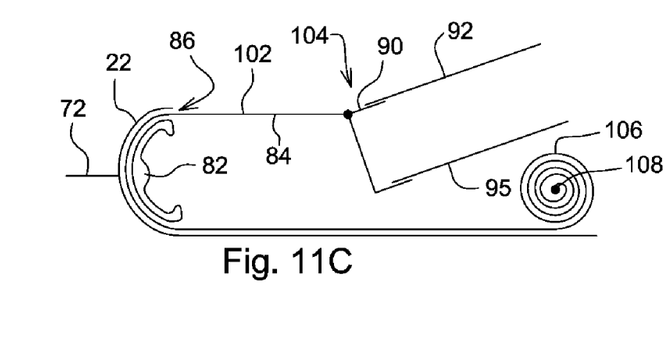
Figure 11D:
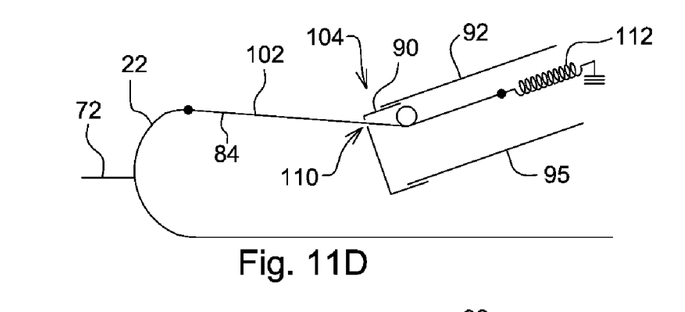
Figure 11E:
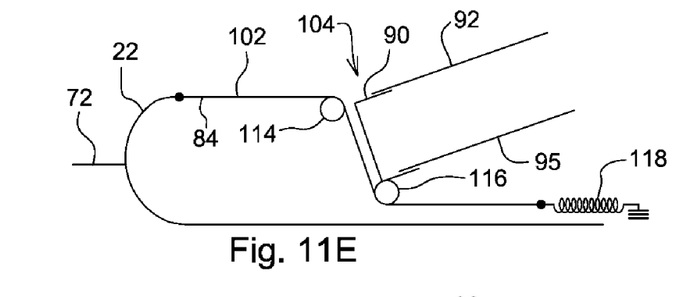
Figure 11F:
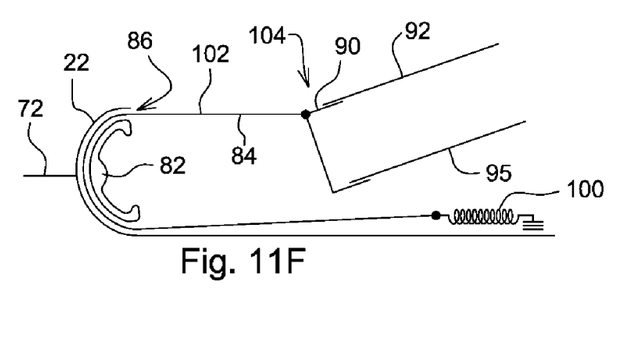

FIG. 11F, for example, illustrates the preferred arrangement (also shown in FIGS. 1-10), in which one end of sections comprising the crop support sheet is fixed to the header adjacent to the leading edge of the conveyors. The sections pass through their respective elongate slots and are pulled backward where they are tensioned with a spring 100. Each section is preferably individually tensioned with its own spring (or springs) 100 When the cutter bar retracts, the spring 100 takes the slack out of the crop support sheet and pulls it backward through the elongate slot, keeping the apron portion between the cutter bar and the conveyors taut.

In the embodiments of FIGS. 11A-11F, the cutter bar assembly is shown in a partially extended position with an apron portion 102 of the crop support sheet 24 (identical in construction and location to apron 97 of FIG. 10) extending between the leading edges 104 of the conveyor belts 26, 28, 30 and the cutter bar.

In FIG. 11A, the sections of the crop support sheet do not extend through an elongate slot 86 in the cutter bar to be pulled backward and tensioned as shown in the foregoing FIGURES. Instead, a first end of the crop support sheet is fixed adjacent to the conveyors just as it is shown in FIGS. 9-10 and the extendible cutter bar 22 itself supports the remainder of each section 84 of the crop support sheet 24. The crop support sheet 24 is wound on a corresponding roll 106 that is fixed to the cutter bar 22, preferably within the space defined by the now-unnecessary guide bar 82. Each section 84 would have its own roll 106 in place of the guide bar 82. The roll preferably includes a spring 108 to keep the section 84 taut when the cutter bar assembly is extended and retracted.

In FIG. 11B, the position of section 24 is reversed from that of FIG. 11A. The first end of the crop support sheet 24 is fixed to the top of the cutter bar 22 to provide a smooth transition from the upper surface of the cutter bar to the crop support sheet. A roll 106 containing the remainder of section 84 wound thereon is disposed adjacent to the leading top surface of the conveyors at generally the same height to provide a smooth transition from each section 84 of the crop support sheet to the conveyor belts 26, 28. The roll preferably includes a spring 108 disposed to keep the section taut when the cutter bar assembly is extended and retracted.

In FIG. 11C, the cutter bar assembly and the sections of the crop support sheet are configured as shown in FIGS. 1-9. In the embodiment of FIG. 11C, each section of the crop support sheet is held in tension by a roll 106 including the spring 108 that is disposed inside the header.

In FIG. 11D, the first edge of each section of the crop support sheet is fixed to the top of the cutter bar in a position to provide smooth crop flow from the top of the cutter bar to each section of the crop support sheet. Each section of the crop support sheet passes through a slot or slots 110 disposed at the leading edge of the conveyors, below the upper run 92 of the left or right conveyors and above the lower run 95 of the left or right conveyors. A spring 112 under tension is coupled to the opposite edge or end of each section of the crop support sheet to maintain the sections of the crop support sheet taut in its extended, retracted and in-between operating positions.

In FIG. 11E, the first edge of each section of the crop support sheet is fixed to the upper portion of the cutter bar as it is in FIGS. 11B and 11D to provide a smooth transition from the cutter bar to the crop support sheet. The remaining portion of each section of the crop support sheet extends backward around a first roller 114, and then around a second roller 116 that are mounted to the header adjacent to the leading edges of the conveyors.

The first roller 114 is disposed to support the crop support sheet adjacent to the leading edges 104 of the conveyor belts to thereby provide a smooth transition of the crop from the crop support sheet to the conveyors. It guides the crop support sheet from the cutter bar and directs it in a more downward direction adjacent the leading edge of the left and right conveyors.

The second roller 116 is disposed to change the direction of he crop support sheet from a generally downward direction to a more horizontal rearward direction and to direct the sheet into the space below the upper run of the left and right conveyors and above the lower run of the left and right conveyors.

The opposite end or edge of each sections of the crop support sheet is coupled to a spring 118 to keep the crop support sheet in tension when the cutter bar assembly extends and retracts.

In each of the embodiments of FIGS. 11A-11F above, section 84 is preferably made if a flexible polymeric coated fabric to give it the wear resistance and flexibility needed to pass through the slots, to be wound up on a reel or roller, to be bent and reverse direction, and to pass around rollers as shown without breaking, tearing or plastically deforming such as sheet metal would.

In each of the embodiments shown in the foregoing FIGURES, a further invention comprises a crop support sheet that includes an apron portion 97 which is configured to change in its fore-and-aft extent to thereby fill a gap between the trailing edge of the cutter bar 22 and the leading edge of the header in the different positions of cutter bar 22 extension. The arrangements above provide this gap-filling not with a rigid metal sheet that covers and uncovers the floor of the header in the traditional manner, but by providing a sheet that can just fill the gap between the cutterbar and the leading edge of the header.

This new arrangement permits the header, whether an auger header or a draper header, to be made shorter in a fore-and-aft direction and therefore lighter. This invention may be executed in the various manners illustrated in the foregoing figures: by automatically rolling up unused portions of the crop support sheet, for example, or routing the crop support sheet beneath the crop conveying surface of the header over rollers or through slots instead of covering the crop conveying surface of the header in the traditional manner with a rigid metal sheet that slides back and forth to cover or uncover portions of the floor of the header.

While the different constructions disclosed in the foregoing figures, and particularly in FIGS. 11A-F, show a variety of different arrangements for automatically varying the working width of the crop support sheet as the cutterbar is extended and retracted, it is anticipated that other arrangements falling within the scope of the claims below can be found to perform the same function and solve the same problem.

What is claimed is:

1. A header for an agricultural combine, comprising:
   An elongate frame having left and right ends;
   a left side conveyor disposed on the left side of the frame and having a first endless belt disposed to receive crop severed on the left side of the header and carry it to a central conveyor;
   a right side conveyor disposed on the right side of the frame and having a second endless belt disposed to receive crop severed on the right side of the header and carry it to the central conveyor;
   a central conveyor disposed between the left and right side conveyors and having an endless belt disposed to receive crop severed from a central region of the head, and to receive crop deposited by the left side and right side conveyors, and to convey said severed crop rearward to a central aperture in the frame;
   a cutter bar assembly supported for slideable movement on the frame toward and away from the direction of header travel during field harvesting, the cutter bar assembly further comprising a cutter bar and a reciprocating knife supported thereon, said reciprocating knife and cutter bar extending across the front of the header in front of the left and right side conveyors and the central conveyor; and
   at least one actuator coupled to the cutter bar assembly and to the frame of the header to extend and retract the cutter bar with respect to the frame.

2. The header of claim 1, further comprising a crop support sheet extending laterally across the substantially the entire width of the header in a direction perpendicular to the direction of travel, and extending between the cutter bar and the leading edge of the left and right conveyors in the direction of travel.

3. The header of claim 2, wherein the crop support sheet has an adjustable length in the direction of travel such that it extends from the cutter bar to the top run of the left and right conveyor in a plurality of extension positions, with a constant spacing between the cutter bar and the crop support sheet in the plurality of extension positions and a constant spacing between the left and right conveyors in the plurality of extension positions.

4. The header of claim 2, wherein the crop support sheet is comprised of a plurality of individual sections spaced apart across the width of the header in the direction of travel.

5. The header of claim 4, wherein each section of the crop support sheet is received in an elongate slot disposed in the cutter bar assembly at the cutter bar to slide therethrough as the cutter bar assembly is extended or retracted.

6. The header of claim 2, wherein the crop support sheet comprises a fabric.

7. The header of claim 6, wherein the fabric is impregnated with a flexible polymeric material.

8. The header of claim 1, wherein the cutter bar assembly includes at least two tubular members extending generally in the direction of travel, said two tubular members being slidably supported on a corresponding at least two additional tubular members fixed to the frame.

9. The header of claim 8, wherein the two tubular members and the two additional tubular members are rectangular and telescopically interengaged.

10. The header of claim 1, wherein the frame includes a plurality of forwardly extending beams, each of said plurality of forwardly extending beams having a lower flange, and further wherein the cutter bar assembly has a corresponding plurality of tubular members, each of said corresponding plurality of tubular members having a slot therein to receive a lower flange of a corresponding forwardly extending beam.

11. A header comprising:
an elongate frame configured to be suspended from a feederhouse of a combine and to extend laterally in a direction perpendicular to a direction of travel of the combine, the frame defining a central aperture configured to pass cut crop material to the combine;

left side and right side endless belt conveyors mounted on the frame and disposed to carry cut crop material laterally inward toward a central portion of the frame, each of the left side and right side endless belt conveyors having an endless belt with a side edge disposed along a leading edge of the header;

a central endless belt conveyor mounted on the frame between the left side and right side endless belt conveyors and disposed to carry cut crop material rearward to the central aperture, the central conveyor having a roller about which an endless belt rotates, the roller extending generally laterally and adjacent to the leading edge of the header; and a cutter bar extending laterally and generally parallel and immediately adjacent to the side edges and the roller when in a first position, and extending laterally and spaced forward away from the side edges and the roller when in a second position.

12. The header of claim 11 further comprising a crop support sheet that extends from the cutter bar to the side edges and roller in both the first and second positions.

13. The header of claim 12, wherein the crop support sheet is flexible.

14. The header of claim 12 wherein the crop support sheet has a rear edge that is fixed immediately adjacent to the side edges and the roller to hold the crop support sheet in place when the cutter bar is translated between the first and second positions.

15. The header of claim 11, further comprising a plurality of laterally spaced apart beams that are fixed to a laterally extending rear frame member and extend forwardly therefrom, each of the beams having an elongate flange.

16. The header of claim 15, wherein the cutter bar is part of a cutter bar assembly including a plurality of rearwardly extending members that are supported on the elongate flanges for movement between the first and second positions.

* * * * *